May 7, 1957 P. MANDEL 2,791,687

ELECTRIC SIGNAL WAVE-FORM CONVERTER

Filed May 31, 1951

INVENTOR
Paul Mandel
By Ralph B. Stewart
attorney 2,791,687

ELECTRIC SIGNAL WAVE-FORM CONVERTER

Paul Mandel, Paris, France, assignor to Societe Nouvelle de l'Outillage R. B. V. et de la Radio-Industrie (R. B. V.-R. I.), Paris, France, a joint-stock company Application May 31, 1951, Serial No. 229,050
Claims priority, application France June 14, 1950
3 Claims. (Cl. 250—27)

The invention relates to an electric wave-form converter for the conversion of electric signals consisting of time-distributed pulses of unidirectional voltage, such as used in pulse code modulation systems, either for transmission or for computation purposes, into a wave-form which is better adapted to the transmission and handling of conveyed information.

Electric signals for pulse code modulation systems more precisely consist of voltage pulse trains in which rectangular pulses of a uniform amplitude value are unevenly distributed within a predetermined and constant time interval so as to be characteristic of the binary values of numerical quantities. An encoder for the generation of such signals may be found, for instance, in my co-pending application, Serial No. 229,049, filed May 31, 1951, for "Electric Signal Encoders," now Patent No. 2,667,633.

The object of the present invention is to provide a new method and means for converting electric signals of the herein above specified kind into signals of a wave-form which does not require the preservation or restoration of an overall D. C. component and only needs a band-width of transmission frequencies which is noticeably reduced with respect to that needed for an undistorted transmission of signals of said specified kind.

The invention is illustrated in the accompanying drawing in which Figs. 1 and 2 are two diagrams illustrating the changes produced in two series of voltage pulses of different form as a result of their passage through a coupling condenser path;

Figure 1:
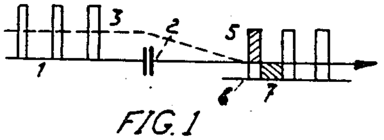
Figure 2:
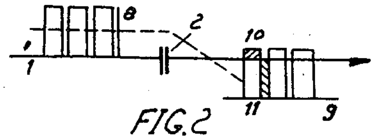

When in a pulse code modulation system, a series of pulses of unidirectional voltage forming part of a coded train of pulses, passes through a coupling condenser 2 of a transmission path 1, as indicated in the diagrams of Figs. 1 and 2, the amplitude value of their flat tops rapidly falls so that the mean amplitude value of the series of pulses reaches a zero level. Considering the base level of the voltage pulses 3, in Fig. 1 to be the zero value, after passing through the condenser the base level falls to 6 so that the hatched portions of the voltage pulses 5 and 7 are of equal areas.

Such an amplitude shift is due to the loss of the overall D. C. component of the pulse train, which D. C. component was apparently characteristic of the mean amplitude value of the signal and consequently characteristic of a part of the conveyed information. As the change in amplitude level of the existing pulses depends, in the first place, on the number of these pulses within a definite time interval, and as in a pulse code modulation system, said number of pulses varies for any pulse train characteristic of a binary value of a quantity, the amplitude level of the transmission is no longer controlled, which is a serious drawback for amplification or peak clipping operations and so forth.

Further, as can be seen by comparing Figs. 1 and 2, the loss of the D. C. component of a series of unidirectional voltage pulses is all the more noticeable as the individual durations of the component pulses are great with respect to the durations of their relative time intervals. In a series of voltage pulses of the same total number, 8 in Fig. 2, as the voltage pulse 3 in Fig. 1, the loss of the D. C. component brings the base level to a lower value 9, producing equality of the hatched surfaces 10 and 11.

In order to overcome this drawback, it was usual to provide for a periodic restoration of the base level of the voltage pulses of a train, thus restoring the D. C. component of said train as soon as lost.

Figure 3:
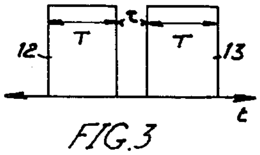
Fig. 3 illustrates two consecutive voltage pulses of unidirectional rectangular wave-form.
Figure 4:
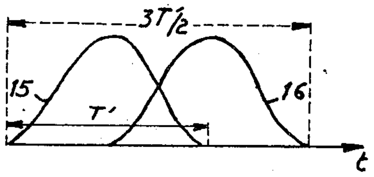
Fig. 4 illustrates the signal resulting from their passage through a circuit or network having a filter characteristic of restricted frequency band-pass.
Figures 5, 6, 7, 8, 9:
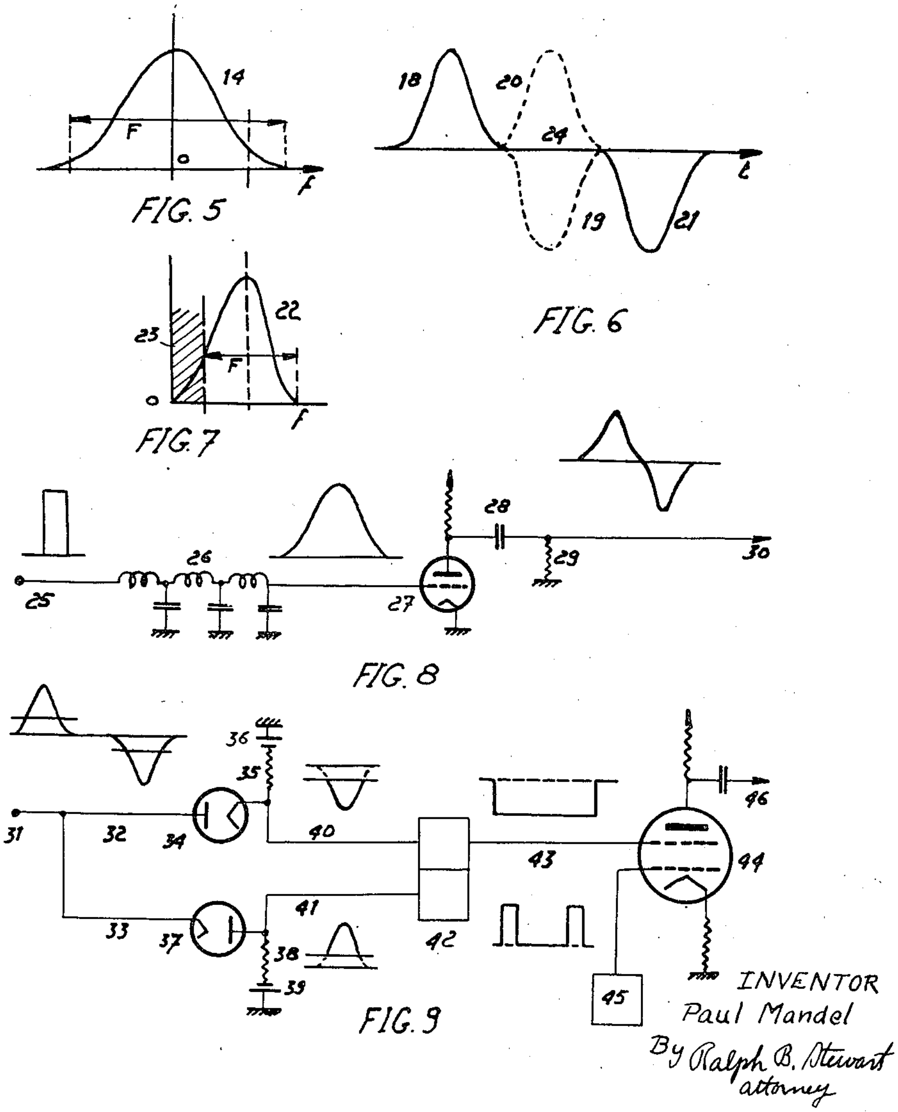
Fig. 5 shows the shape of the envelope of the frequency spectrum needed for the transmission of a unidirectional voltage pulse such as one of the pulses of Fig. 3.
Fig. 6 illustrates the signal obtained from the electric differentiation of the signal shown in Fig. 4.
Fig. 7 shows the shape of the envelope of the frequency spectrum needed for the transmission of an element of the signal of Fig. 6.
Fig. 8 shows the circuit arrangement of an electric signal wave-form converter according to the invention.
Fig. 9 shows the circuit arrangement for the reconversion of the wave-form issuing from the arrangement of Fig. 8 into the original wave-form as applied to the input of said arrangement of Fig. 8.

Now, considering Fig. 3, one of the two consecutive voltage pulses illustrated, 12 or 13; and considering the distribution of the frequencies in the same envelope curve 14, Fig. 5, the width of the band of frequencies necessary for their transmission, namely F, is inversely proportional to the duration T of a voltage pulse. The width of this band of frequencies remains the same after passage of the said pulses 12 and 13 through a circuit or network having a filter characteristic by which it supplies an impulse response of a bell-shape, Fig. 4.

The width T' of each of the pulsations 15 and 16 in Fig. 4 does not depend on the duration T of each of the voltage pulses 12 and 13 in Fig. 3, but on the inherent response characteristic of a filter circuit of the kind concerned with the application on its input of a voltage pulse of very short duration with respect to its time-constant of transmission, so that any rectangular voltage pulse is considered by said filter circuit as a transient signal including a substantially infinite frequency spectrum with a statistical distribution of the frequency components in said spectrum. As well-known, such a statistical distribution is represented by the bell-shaped curve of Gauss and, for better defining the kind of filter circuit included in a signal converter according to the invention, one may call such a filter circuit a "Gaussian" filter. Its actual structure, as will be seen from Fig. 8, is that of an electric filter comprising, for instance, series inductive elements and capacitive shunt elements connected from the interconnection points of said series elements to a point of common and constant potential, for instance the ground potential. As the two pulses 12 and 13 provide a relatively short interval $t$ between them, relatively to their duration T, the two response signals 15 and 16 overlap and, for small values of $t$, an amplitude discriminating means or circuit receiving this signal could not operate correctly.

The passage of a signal of the kind specified through such an impulse response circuit is, however, the first step provided for in the method of conversion according to the present invention, though it seems to lead to an accentuation of the difficulties of transmission of such signals.

Now, according to the second step, the electric signal shown in Fig. 4 for instance, is electrically differentiated in the mathematical meaning of the word. The differentiation of a bell-shaped signal such as one of the pulsations 15 and 16 of Fig. 4 results in a signal which presents half-waves of opposite directions or polarities and is of an overall duration equal to that of the pulsation from which it has been derived, see Fig. 6. For instance, the pulsation 15 gives a signal having two half-waves or alternations 18 and 19, and the pulsation 16 gives a second signal having two half-waves or alternations 20 and 21. In the first place, this signal being of double polarity can pass through any circuit which does not pass direct current without its transmission being thereby affected. In the second place, as shown by considering the diagram of Fig. 7, each of said half-waves or alternations requires for its transmission only a band of frequencies which is of the differentiated shape, itself, of half the band 14, Fig. 5. Further, in this curve of frequency variation 22, the weakening or the cutting off of the low frequencies, such as indicated at 23 does not substantially distort the transmitted signal of which the frequency bandwidth can, in consequence, be reduced by about two-thirds of the width which was needed for an undistorted transmission of a signal consisting of rectangular pulses.

Finally, if as illustrated, the signal is composite resulting from the semi-superposition or overlap of the impulse response of a filter network to the application of two voltage pulses spaced by an interval such as $t$, suitably selected with respect to the duration of the impulse response of said circuit, and vice-versa, the half-waves or alternations such as 19 and 20 of the differentiated signals will be superposed in time and, being of opposite polarities, will substantially cancel out as shown. In consequence, not only does the carrying out of the method according to the invention lead to easy discrimination of the starting and ending elements of a converted signal, but again it leads to the production of particularly simple signal shapes, of reduced durations. As can be seen in Fig. 6, the transmission of a pair of pulsations of individual duration T′, will require a total time interval of $3T'/2$ only, and a substantially reduced frequency band.

Fig. 8 illustrates the arrangement of an electric signal wave-form converter according to the invention. It comprises, from the input terminal 25 to the output channel 30, a filter 26, a separating stage 27 and a differentiating circuit 28—29. As shown, the filter network of a bell-shaped response curve is of a usual filtering structure and the series branch of said filter is connected to the control grid of a separator or buffer stage 27, for instance comprising a triode vacuum tube; the grid bias has been omitted and the output taken in the plate circuit of said tube; the voltage differentiating network comprises a series condenser 28 connected to the output channel 30 and a shunt resistor 29, the other end of which is connected to a point of constant D. C. potential, for instance the ground potential.

On the input terminal 25 may be applied any incoming signal of the kind specified, for instance, the signal issuing from an encoder such as described in the above cited application; on the output channel 30, the converted wave-form signal is available and may be picked up for any use in a modulating signal for a pulse code modulation system.

When required, the reconversion of wave-form of any signal issuing at 30 can be effected by means of the circuit arrangement disclosed in Fig. 9.

Said reconverter arrangement comprises, from its input terminal 31, two parallel channels 32 and 33, including each a unidirectional conductor element such as a diode tube 34 or 37, respectively. Terminal 31 is connected to the plate and its cathode is biased through a resistance 35 by a battery 36, and transmits the positive half-wave of the incoming signal; a threshold bias is however provided for cancelling out any possible combination residues of signals at the input 31. The cathode of diode 37 is connected to terminal 31 and its plate is biased through a resistance 38 by the battery 39 so as to allow only the negative half-waves to pass. On the conductors 40 and 41 respectively will therefore appear the half-waves of opposite directions of the incoming signal. These half-wave voltage pulses are applied to the two actuation inputs of a bi-stable trigger circuit 42. One of the outputs 43 from said bi-stable trigger circuit controls the condition of conductibility of a vacuum tube 44 to another grid of which is applied an uninterrupted sequence of voltage pulses from source 45 of the same recurrency as those from which were controlled the voltage pulses of the electric coded signal prior to its conversion. Thus, when a negative pulse, at the start of an incoming signal, unblocks the tube 44 through the trigger 42 which registers said pulse, the voltage pulses from the generator 45 are transmitted to an output channel 46. Inversely, this transmission is interrupted on the arrival of the positive half-wave at 31 which, in an electric signal converted in accordance with the invention, is characteristic of the termination of a series of sequential pulses in a coded pulse train. Said positive half-wave actuates the trigger circuit 42 back to its other stable condition. It proceeds again only on the arrival of the following half-wave at 31, which is of opposite polarity or direction, and so forth.

I claim:

1. In a pulse code modulation system for the transmission of pulse signals over a transmission channel by a transmission frequency band-width substantially reduced with respect to that needed for the undistorted transmission of signals of rectangular pulses, the combination of an input circuit supplying pulse trains comprising regularly spaced voltage pulses of rectangular wave-form, an impedance network connected to said input circuit and having a bell-shaped impulse response characteristic for converting said rectangular pulses into overlapping bell-shaped impulses at the output of said network, and a differentiating circuit connected to the output of said network for differentiating the overlapping bell-shaped pulses issuing from said network and supplying said differentiated pulses to said transmission channel.

2. A combination according to claim 1 and including a vacuum tube buffer stage interposed between the output of said network and said differentiating circuit.

3. In a system for the transmission of pulse signals over a transmission channel by a transmission frequency band-width substantially reduced with respect to that needed for the undistorted transmission of signals of rectangular pulses, an improved transmitter apparatus connected to the input of said channel and comprising a source of time-distributed voltage pulses of uni-directional rectangular form, an impedance filter network of bell-shaped impulse response characteristic receiving rectangular pulses from said source and converting them into bell-shaped pulsations, a differentiating network for differentiating the bell-shaped pulsations issuing from said filter network and supplying differentiated signal pulses to the input of said channel, and a vacuum tube buffer stage interconnecting the output of said impedance filter network to the input of said differentiating network.

References Cited in the file of this patent

UNITED STATES PATENTS

| | | |
|---|---|---|
| 2,086,918 | Luck | July 13, 1937 |
| 2,209,883 | Gohorel | July 30, 1940 |
| 2,252,447 | Ulbricht | Aug. 12, 1941 |
| 2,418,521 | Morton et al. | Apr. 8, 1947 |
| 2,448,718 | Koulicovitch | Sept. 7, 1948 |
| 2,513,478 | Gutton | July 4, 1950 |
| 2,579,071 | Hansell | Dec. 18, 1951 |
| 2,580,421 | Guanella | Jan. 1, 1952 |
| 2,681,384 | Guanella | June 15, 1954 |